Patented Aug. 28, 1934

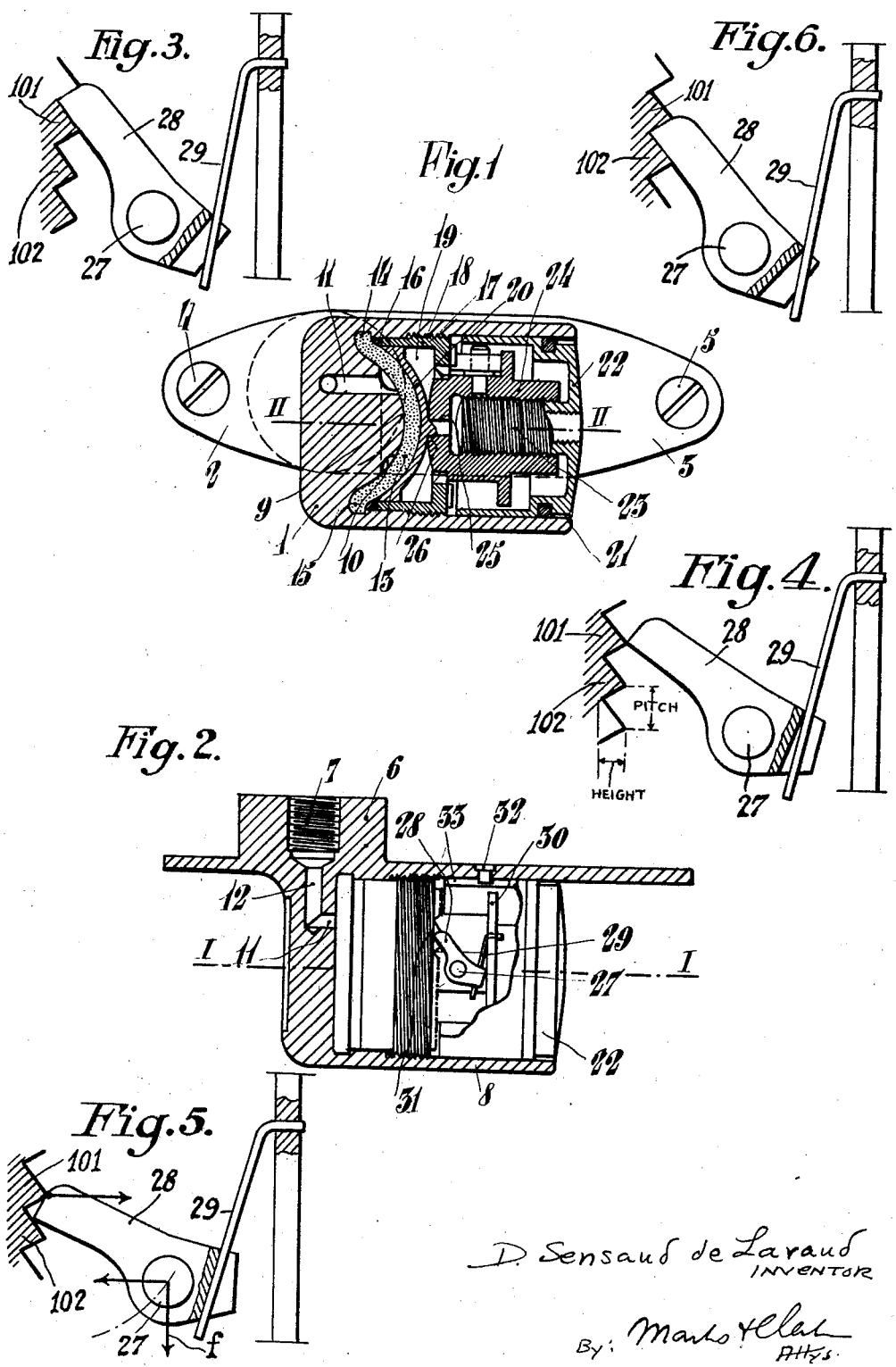

1,971,643

UNITED STATES PATENT OFFICE 1,971,643

AUTOMATIC ADJUSTING DEVICE

Dimitri Sensaud de Lavaud, Paris, France

Application January 22, 1930, Serial No. 422,662
In France January 30, 1929

3 Claims. (Cl. 188—79.5)

The present invention has for its object an automatic adjusting device for transmission of stresses of any nature and particularly for brakes.

The applications of the device are multiple, and are all included in the scope of the invention; this device may be used for all riggings capable of lengthening or wearing, and particularly for brakes, such as railway, tramway brakes, or the brakes of motor vehicles.

The following description more particularly relates to a form of construction of this particular application, given by way of example only, because it appears to be, for the moment, one of the most important.

One of the most troublesome inconveniences encountered in practice in the use of usual brakes, such as those employed on motor cars, is the necessity of frequent adjustment required by the progressive wear and collapsing of the plastic material lining the segments or cheeks.

In these conditions, an increasing wear necessitates a greater stroke of the operating member, so that the braking power very quickly diminishes, this necessitating a new adjustment of the member expanding the segments or cheeks, adjustment which has to be repeated after a certain time of use.

The device in accordance with the invention allows an entirely automatic taking up of the play due to wear, as soon as this play exceeds an arbitrarily chosen value.

The accompanying drawing illustrates, by way of example only one form of construction of the invention.

Fig. 1 is a sectional elevation along line I—I of Fig. 2.

Fig. 2 is a sectional plan view according to line II—II of Fig. 1.

Figs. 3, 4, 5 and 6 are enlarged side elevations and part sections of the pawl and ratchet arrangement in different operating positions.

Let $l$ be the stroke provided for the control intended to compensate the resilient distortions of the brake segments, $e$ the normal clearance between the brake segment and the drum in releasing position, $e'$ the limit wear play allowed without taking up action, that is to say, that part of the height given to the teeth which corresponds to the limited play allowed in excess of the braking stroke. The height given to the teeth will be: $l+e'$.

Upon assemblage, the clearance or play is $e$ and, when the brake is released, the pawl abuts on the bottom of a tooth. When the brake is thereupon fully operated, the pawl slides, on the to and fro movement, on this tooth according to the amount $l$, without leaving it, as it is pressed by a spring against this tooth. In other words $l$ is that part of the height given to the teeth which corresponds to the normal braking stroke $e$.

When play due to wear begins to take place, between zero and $e'$, the stroke and the brake shoe clearance slightly increase. As soon as the limit play $e'$ is reached, the stroke becomes $l+e'$, equal to the height of the teeth, so that, at the end of the stroke, the pawl is released from its tooth and rotates according to an extent limited by an abutment for coming opposite the following tooth. Upon return, the pawl then abuts on the bottom of this tooth, and the nut being subjected to a rectilinear displacement, is compelled to rotate. It suffices that the rotation corresponding to the stroke has modified, according to the amount $e'$, the spacing between the brake segment and the thrust member, elements between which the nut is interposed.

The stroke is not only brought back to its original value $l$, but the position at the end of the stroke of the thrust member again becomes the same. The brake is automatically brought back to its position of assemblage. Likewise, the brake shoe clearance becomes $e+e'$ at the time the clearance or taking up of the play takes place, and this is reduced to the value $e$ immediately after the automatic correction. It can therefore never drop below its assemblage value or increase by more than $e'$. As $e'$ can be arbitrarily chosen by the value of the height of the teeth, it is obvious that the fundamental characteristic features of the brake can be maintained as little variable as desired.

It is to be noted that upon application of the brake, the nut has no tendency to rotate, as its pitch is sufficiently small for causing it to be irreversible.

In this example, the apparatus comprises the main parts hereinafter described:

A body or frame 1 is mounted, by means of lugs 2 and 3, on the fixed cheek member closing the brake drum. The fixing in position is ensured by any means, and for instance by the screws 4 and 5 provided with nuts. On one of the faces of the plane defined by the lugs 2 and 3, is provided a boss 6 perforated with a hole 7 arranged for receiving the flexible coupling of a pressure fluid inlet pipe line. On the other face, is arranged another boss 8 internally bored parallel to the plane of the lugs 2—3, as will be explained later on.

The bottom of the said bore has a spherical shape, as shown at 9, and this bottom is provided with a groove 10 which is in communication, through the hole 11 and the hole 12, with the orifice 7. The bottom 9 is covered by a spherical rubber cap 13. The cap 13 is provided with ledges 14 and 15 which are held in place by clamping, by means of a washer 16 on which acts a screw 17 mounted in the screw-threaded bore 18 of the boss 8. The screw 17 is cylindrically bored at 19, and in this bore, can slide a rigid cap or transmitting member 20, which covers the rubber cap 13.

Within the cylindrical bore 21 slides a piston or receiving member 22 acting on one of the brake segments or cheeks. The rod of the piston, shown at 23, is screw-threaded and, on this screw is fitted a nut 24. The said nut is perforated, at 25, with a centering hole for a stud 26, belonging to the cap or transmitting member 20. Moreover, the nut or connecting member 24 receives radial axes 27, in any number whatever, and for instance three, on which pawls 28 are pivoted, the said pawls 28 are held by a flexible rod 29 which, at one of its ends, enters a hole of the said pawls, whilst, at its other end, it enters a corresponding hole of a collar 30 rigid with the nut. The pawls 28 cooperate with radial teeth 31 belonging to the screw 17. The spring 29 however, never causes the collar 30 to rotate. It is necessary that the connecting member or nut 24 should rotate on an axis parallel to the direction of translation. It is also necessary that this rotation changes the distance between the cap or transmitting member 20 and the piston or receiving member 22.

The screw 23 has two functions for the connecting member or nut 24 is adapted to rotate on this screw and this rotation varies the distance between members 20 and 22. The flexible rod 29 consists of a spring having the tendency to turn the pawl 28 in opposite direction to the clock.

The operation is as follows:

At the time of braking, oil under pressure is admitted, through the orifice 7 and the holes 12 and 11, into the groove 10. The cap 13 swells, and through the medium of the cap 20 which is shifted to the right of Fig. 1, pushes the nut 24 and the rod 23 of the piston 22 in the same direction. The nut 24 is also shifted to the right but has no tendency to rotate relatively to the receiving member or piston 22, as the pitch of the screw-thread is small; the piston 22 is also pushed in the right direction because the thread 23 is non-reversible and said piston 22 is itself prevented from rotating by a finger 32 entering a longitudinal groove 33 of the said piston. The translation of the piston or receiving member 22 actuates the brake segment or cheek; during this translation, the spring 29 holds the pawl 28 in contact with the flank of the tooth 31 with which it is in engagement.

If the stroke of the piston or receiving member 22 exceeds, for instance owing to the wear of the brake linings, the predetermined maximum, the pawl 28 releases from the tooth 31 under the action of the spring 29 which causes it to rotate to a sufficient extent for causing this pawl 28 to come opposite the following tooth. At the time of releasing the brake, under the action of the brake segment returning spring, the piston or receiving member 22 is moved backwards, as well as the nut connecting member 24. The pawl 28 props in the new tooth. This propping has for effect to compel the nut or connecting member 24 to rotate, for taking up the play due to wear. During displacement to the right, the pawl 28 has the tendency to become disengaged from the tooth 101 with which it engages, see Fig. 4 of the accompanying drawing. If the path of the nut or connecting member 24 is exceeded, $l+e'$, the pawl 28 under the action of spring 29 becomes disengaged from the tooth 101 and engages with the tooth 102 Fig. 5 of the drawing.

When the braking ceases, the spring of the brake jaws brings the piston 22 to the left. This piston is prevented from rotating by the finger 32 and the groove 33. On the other hand, the pawl 28 bears against the tooth 102 see Fig. 5. Consequently, a couple is produced, as shown in Fig. 5, which tends to rotate the pawl 28 on its axis 27. However, this rotation can only take place by producing on the axis 27 a pressure in the direction of the arrow $f$. Since the axis 27 is fixed to the nut or connecting member 24 this pressure causes the said nut to rotate.

Consequently, the force which causes the nut or connecting member 24 to rotate is that of the antagonistic springs of the brake jaws at the end of the braking and not the force of the spring 29. This latter spring only serves during the braking for causing the pawl 28 to pass from one tooth, to the following tooth when the path of the connecting member 24 is exceeded $l+e'$.

The spring 29 is a wire or rod which is bent, as shown in the sketch, by the force of the antagonistic springs of the brake jaws when the braking ceases. It has been explained that the return to rest causes a tensioning of rod 29 which forces the rotation of pawl 28.

What I claim as my invention and desire to secure by Letters Patent is:—

1. In a device for the transmission of movements of translation, a movement transmitting member and a receiving member, a connecting member between the transmitting member and the receiving member, means providing pivotal connection of said connecting member to at least one of the other two members for pivoting about a geometrical axis parallel to the direction of translation, means whereby the rotation of the connecting member modifies the spacing between the transmitting member and the receiving member, a ratchet connection comprising two parts, the first part being a plane disk having ratchet teeth arranged with its geometrical axis coinciding with the first named axis and the second part being a spring pressed pawl engaging one of said teeth, means for making one of the said two parts stationary, and means for connecting the other of said two parts to the connecting member.

2. In a device for the transmission of movements of translation, a movement transmitting member and a receiving member, a connecting member between the transmitting member and the receiving member, means providing pivotal connection of said connecting member to at least one of the other two members for pivoting about a geometrical axis parallel to the direction of translation, means whereby the rotation of the connecting member modifies the spacing between the transmitting member and the receiving member, a plane disk having ratchet teeth arranged so that its geometrical axis coincides with the first named axis, a spring pawl engaging one of said teeth and forming therewith a ratchet connection, means for making the disk stationary and means for connecting the pawl to the connecting member.

3. In a device for the transmission of movements of translation, a movement transmitting member and a receiving member, a connecting member between the transmitting member and the receiving member, means providing pivotal connection of said connecting member to at least one of the other two members for pivoting about a geometrical axis parallel to the direction of translation, means whereby the rotation of the connecting member modifies the spacing between the transmitting member and the receiving member, a plane disk having ratchet teeth arranged so that its geometrical axis coincides with the first named axis, a spring pawl engaging one of said teeth and forming therewith a ratchet connection, means for making the disk stationary and means for connecting the pawl to the connecting member.

DIMITRI SENSAUD DE LAVAUD.